(12) United States Patent
Bailey

(10) Patent No.: US 8,568,241 B2
(45) Date of Patent: Oct. 29, 2013

(54) APPARATUS FOR COVERING A GAME CONSOLE

(76) Inventor: Victor J. Bailey, Las Vegas, NV (US)

( * ) Notice: Subject to any disclaimer, the term of this patent is extended or adjusted under 35 U.S.C. 154(b) by 125 days.

(21) Appl. No.: 13/221,492

(22) Filed: Aug. 30, 2011

(65) Prior Publication Data
US 2013/0053153 A1    Feb. 28, 2013

(51) Int. Cl.
*A63F 13/02* (2006.01)
(52) U.S. Cl.
USPC .............. 463/46; 463/47; 206/320; 273/148 B
(58) Field of Classification Search
USPC ................... 463/46, 47; 206/320; 273/148 B
See application file for complete search history.

(56) References Cited

U.S. PATENT DOCUMENTS

| | | | | |
|---|---|---|---|---|
| 5,197,178 A | * | 3/1993 | Lichte et al. | 29/428 |
| 6,932,341 B1 | * | 8/2005 | Kenyon | 273/148 B |
| 7,048,556 B2 | * | 5/2006 | Stanton et al. | 439/135 |
| 2006/0258464 A1 | * | 11/2006 | Kawanobe et al. | 463/46 |
| 2010/0096284 A1 | * | 4/2010 | Bau | 206/320 |
| 2012/0071248 A1 | * | 3/2012 | Hovseth | 463/46 |

\* cited by examiner

*Primary Examiner* — Arthur O. Hall
*Assistant Examiner* — Allen Chan

(57) ABSTRACT

An apparatus comprises a cover for top and side surfaces of an electronics device operable for playing games. The cover comprises an opening being configured for enabling access to a game slot of the electronic device. The cover further comprising a first part of a capturing mechanism disposed proximally about at least a portion of a perimeter of the opening. An opening cover is configured to at least cover the opening. The opening cover comprises a second part of the capturing mechanism being configured to be removably joined to the first part of the capturing mechanism to form a seal where the cover and the opening cover are operable for mitigating entry of liquids and particles in covered areas of the electronics device and for mitigating impact and abrasion damage to covered areas of the electronic device.

3 Claims, 2 Drawing Sheets

APPARATUS FOR COVERING A GAME CONSOLE

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to electronics. More particularly, the invention relates to a cover for electronic game consoles.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that video game consoles are a common means for entertainment that may be found in many homes. These game consoles and the video games that are played on them are often expensive, and one can expect that users would like to maintain the good condition of these game consoles so that they may be used for extended periods of time.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a top perspective view. FIG. 1B is a front perspective view. FIG. 1C is a rear perspective view. FIG. 1D is a bottom view of the cover on a game console. FIG. 1E is a top perspective view of the cover partially installed on the game console. FIG. 1F is a rear perspective view showing an attached power cord, and FIG. 1G is a side perspective view showing an access flap in an open position.

Figure 1A:
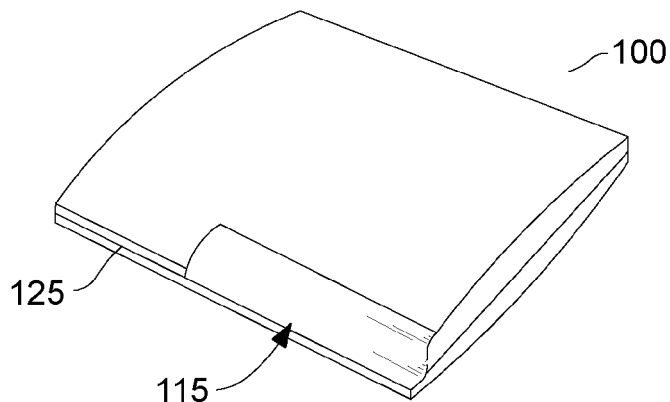
FIGS. 1A through 1G illustrate an exemplary game console cover, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

It is believed that, like many electronic products, video game consoles are prone to damage, yet not in the same way as small portable products. Instead, game consoles are often subject to permanent damages caused by spills and other occurrences. For example, without limitation, players may spill beverages on top of game consoles, which may permanently damage the electronic components of the consoles; players may scratch game consoles by placing joysticks and other items on top of them; players may bump into game consoles or pull game consoles from their areas of placement while playing, which may cause jarring or impact that can break the consoles; players may throw a controller or remote at the game consoles. With the costs of these consoles, not to mention the cost of the games that are played on these consoles which are also subject to these occurrences, these damages can be quite costly. A practical embodiment of the present invention features a durable yet pliant material of particular size for individual fitting upon a video game console with strategically placed apertures that are aligned to individual jacks, vents and ports of the console and a pliant flap lined with hook-and-loop material to allow access to a slot of the console for inserting game cartridges. Many practical embodiments protect home video game consoles while decorating their environments of use.

Figure 1B:
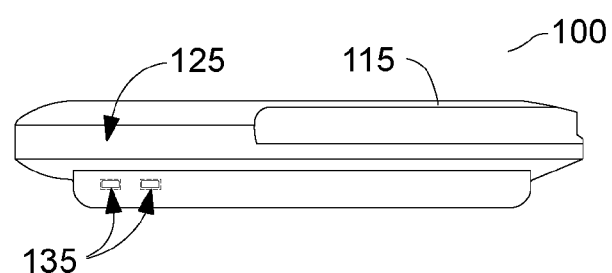
Figure 1C:
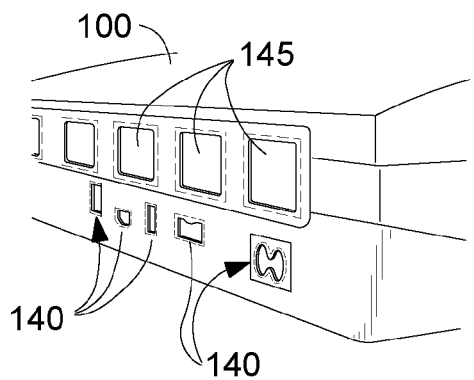
Figure 1E:
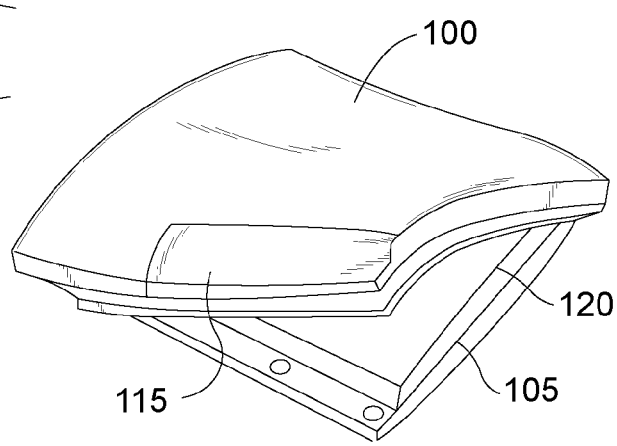
Figure 1D:
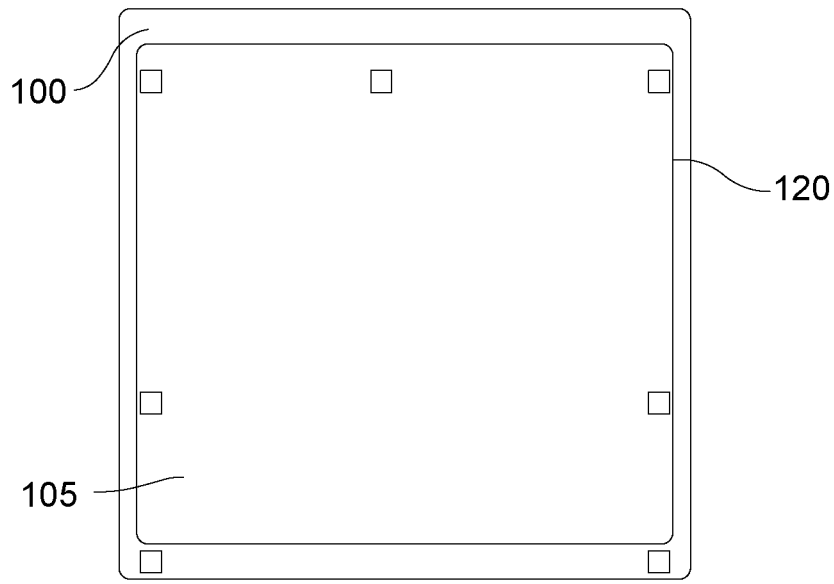
Figure 1F:
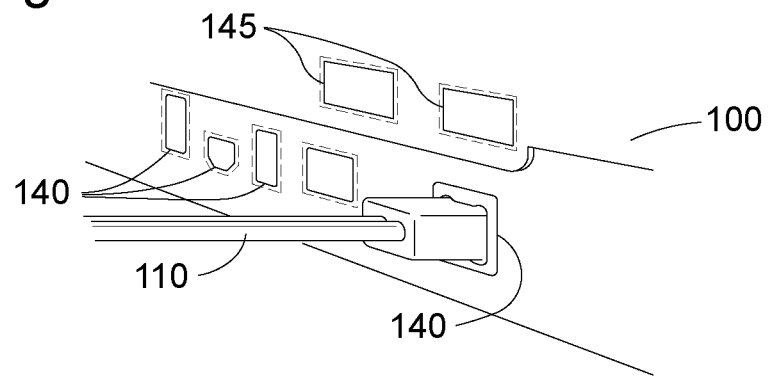
Figure 1G:
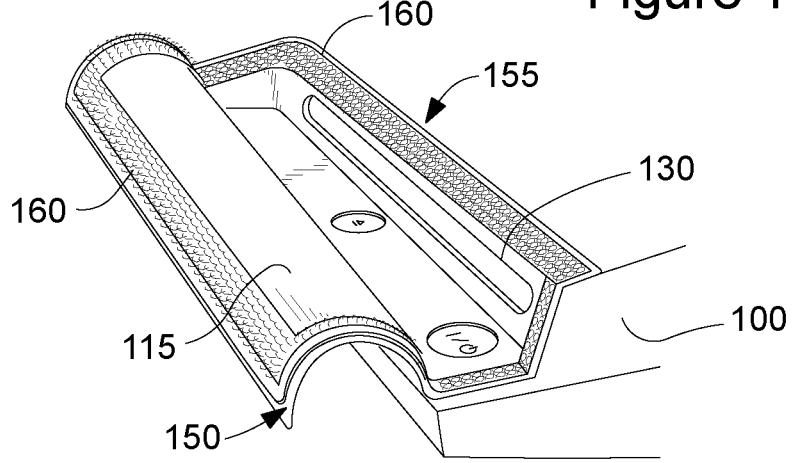

FIGS. 1A through 1G illustrate an exemplary game console cover 100, in accordance with an embodiment of the present invention. FIG. 1A is a top perspective view. FIG. 1B is a front perspective view. FIG. 1C is a rear perspective view. FIG. 1D is a bottom view of cover 100 on a game console 105. FIG. 1E is a top perspective view of cover 100 partially installed on game console 105. FIG. 1F is a rear perspective view showing an attached power cord 110, and FIG. 1G is a side perspective view showing an access flap 115 in an open position. In the present embodiment, cover 100 is designed to fit on game console 105, which is illustrated, by way of example, as a PlayStation 3™. However, some alternate embodiments can be made in many different variations for use with other home video game consoles, and game console covers in these alternate embodiments are not limited to the particular size and shape illustrated, by way of example, in FIGS. 1A through 1G. In the present embodiment, cover 100 is made of a pliant silicone material of an approximate quarter-inch (¼") depth and measures approximately twelve and three-quarter inches in width by four inches in height by eleven inches in length (12¾"×4"×11"). Some alternate embodiments may be made of various different materials of adequate durability and flexibility such as but not limited to, plasticized polyvinyl chloride, various different plastics, rubber, foam, etc. Also, the material in some alternate embodiments may be thicker or thinner. Some alternate embodiments may include, without limitation, a separately attached rubber coating about the exterior of the cover for further protection. Referring to FIGS. 1A and 1B, in the present embodiment, cover 100 comprises texturing 125 to provide grip to cover 100. Some alternate embodiments may comprise texturing in various different locations on the cover, and other alternate embodiments may be implemented without any texturing. Referring to FIGS. 1D and 1E, game console 105 is inserted into cover 100 through an open end 120 on the bottom of cover 100. The silicone material provides a tight seal that hugs the sides of game console 105 and generally prevents liquids from damaging game console 105, such as, but not limited to, liquids that may come into contact with game console 105 due to the accidental spillages that may occur during game play or at other times. Some alternate embodiments may also comprise a separate piece to cover the bottom of the game console that may attach to the cover using various different means such as, but not limited to, tightly slipping over the cover, hook and loop material, adhesive, etc. Other alternate embodiments may comprise openings in various different locations into which the consoles may be inserted, including, but not limited to, the back or the sides.

In the present embodiment, cover 100 allows direct access to all apertures, controls, buttons, jacks, ports, cartridge slots and/or dock connectors featured upon game console 105, and the tight seal of cover 100 is extended throughout each of the openings of game console 105. Referring to FIG. 1B, the lower-left facing of the front of cover 100 comprises two half-sized apertures 135 for two Universal Series Bus (USB) jacks located on game console 105, and in direct alignment to the placement of said jacks upon game console 105. The apertures are only ½ the size of the USB jack. The reason they are only half size is so the user has to pry them into place. The pliability of the cover will allow the ½ sized apertures to give and allow insertion of the USB jack. However, the cover will cinch around the perimeter of the USB jack creating a seal. Apertures 135 enable control devices such as, but not limited to, joysticks, hand held button controllers, control pads, steering wheels, etc. to be hooked up to game console 105 without the removal of cover 100. Referring to FIGS. 1C and 1F, the rear wall of cover 100 comprises half-sized apertures 140 in alignment to the jacks and ports upon the same location of game console 105 to allow all necessary cables to be inserted into game console 105. The perimeters of apertures 140 extend one-eighth of one inch (⅛"). Apertures 135 and 140 are shaped similarly to the acceptance ports that they surround. This enables a user to rapidly and visually ascertain which cable goes into which port. The perimeters of apertures 135 and 140 are reinforced with a slightly less pliable material than the rest of cover 100. This reinforced area may be a different material than the rest of cover 100 or may simply be a thicker amount of the same material from which the rest of cover 100 is produced. This design forces the user to work the cables into tight apertures around the acceptable ports. Referring to FIG. 1F, when cable 110 is in place, aperture 140 tightly seals around cable 110 to substantially complete a waterproof seal. Some alternate embodiments may be implemented with apertures that are not reinforced. In some alternate embodiments, plugs may be included with the cover or attached to the cover at these apertures to be inserted into ports or jacks that are not in use for additional protection. In the present embodiment, the rear wall of cover 100 comprises large openings 145 that are to be situated over the ventilation area of game console 105. Openings 145 generally ensure that game console 105 can adequately ventilate, which helps to promote a long functioning life of game console 105. In some alternate embodiments, these ventilation openings may be various different shapes and sizes. For example, without limitation, in some embodiments these openings may be a multiplicity of small slits. In other embodiments, these openings may be covered by movable flaps that provide some protection while still enabling heat to escape from the console.

Referring to FIGS. 1A, 1B, 1E, and 1G, in the present embodiment, the top-right facing of the top length wall of cover 100 comprises separate flap 115, which measures approximately six inches in width by two inches in length (6"×2") for covering a game cartridge slot 130 of game console 105. It is contemplated that this flap may be various different sizes in some alternate embodiments depending on various factors such as, but not limited to, the type of game console being protected, the type of game cartridge being used, the location of the game cartridge slot, the opening and closing means of the game cartridge slot, etc. Referring to FIG. 1G, in the present embodiment, the interior perimeter of flap 115 features an extending ridge 150 of one-eighth of one inch (⅛") height around the perimeter, which aligns with and seals into a recessed channel 155 about the same perimeter area upon the main body of cover 100. A swatch of hook-and-loop material 160 is included without limitation to provide a firm seal of flap 115. Those skilled in the art, in light of the teachings of the present invention, will readily recognize that a multiplicity of suitable means may be used to seal the flap in the closed position such as, but not limited to, snaps, adhesives, zippers, tabs, etc. Other alternate embodiments may be implemented without a flap for the game cartridge slot. Instead, these embodiments may provide access to this slot using various different means such as, but not limited to, apertures in the cover aligned with the slot or a separate piece that may be removed from or attached to the cover.

In typical use of the present embodiment, referring to FIG. 1E, a user may insert game console 105 into cover 100 in the proper position for aperture alignment to jacks, ports and slots. Cover 100 easily applies upon game console 105. Referring to FIGS. 1B, 1C and 1F, the user may then attach all required cables and wires to said jacks and ports. Cover 100 tightly seals all connective wiring to game console 105 through marginally sized apertures 135 and 140 leading to the jacks of that wiring and generally prevents liquids from entering the housing of game console 105 through apertures 135 and 140. Then with flap 115 in the open position, as illustrated by way of example in FIG. 1G, the user may then insert a game cartridge into cartridge slot 130. The user then closes flap 115 so that raised ridge 150 is inserted into channel 155 to create a seal about the perimeter of flap 115, which substantially blocks liquids from entering cartridge slot 130.

Once cover 100 is applied to game console 105, cover 100 encapsulates and protects game console 105 and generally ensures that game console 105 can withstand potential damages, for example, without limitation, damages from common impacts, damages caused by frictional contact upon the housing of console 105, liquid damage due to accidental spills, etc. This protection can improve the longevity of game console 105. Covers according to the present embodiment can be used in various different setting including, without limitation, private households, hotels, vacation centers, recreational venues, and all other environments that include video games in their entertainment offerings. These covers can also protect game consoles during transport. Since cover 100 encapsulates game console 105, cover 100 generally prevents the housing of game console 105 from gathering a build-up of dust and stains or smudges caused by sweat on the hands of users or caused by other means. In addition, cover 100 can be easily cleaned and is easier and safer to clean than game console 105 is.

Video game consoles typically do not get hidden away in a closet or closed within a drawer when not in use and often do not offer many variations that complement the décor of the household or complementing furniture specifically for display. Instead, game consoles often catch eyes and gather attention in a clashing, standout format. In the present embodiment, cover 100 can enable personalized decoration of game console 105 to allow game console 105 to become part of the household décor and generally prevent game console 105 from standing out in contrast to household décor. For example, without limitation, cover 100 can be made in various different colors to complement the décor of a room, including, without limitation, translucent and glow-in-the-dark colors. Many practical embodiments enable video game consoles to be decorated in many more colors and themes than such consoles currently offer, as such consoles are typically only available in two (2) different solid-color variations. In some alternate embodiments, the covers enable video game consoles to be decorated in multiple colors and designs and with various images, logos and/or themes which may or may not be of registered trademark and/or copyright status, including, without limitation, images, designs and/or logos affiliated with particular video games. In some embodiments, the covers can be made in variations that can be personalized by the consumer, for example, without limitation, by adding decals or stickers.

Those skilled in the art, in light of the teachings of the present invention, will readily recognize that covers may be implemented in alternate embodiments for use on a multiplicity of suitable video game consoles. The PS3™ is used by way of illustration in the foregoing embodiment for exemplary purposes only, and covers in some alternate embodiments may be produced in various different shapes and sizes in order to accommodate various different game consoles that are currently on the market such as, but not limited to, PlayStation™, X-Box™, Wii™, XaviXPORT™, Zeebo™, Zone 40™, Hyperscan™, N-Gage™, Game Wave™, Generation NEX™, HyperScan™, etc. and to accommodate newly designed game consoles that are yet to be introduced to the market. In some alternate embodiments covers may be implemented in variations specifically sized and designed for various different types of electronic devices such as, but not limited to, PC towers, laptop computers, handheld video games, cellular telephones, other personal electronic devices, etc. Furthermore, a multiplicity of suitable additional features may be incorporated into some alternate embodiments such as, but not limited to, lighting appendages of various formats, carrying straps, pockets, etc.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of providing a game console cover according to the present invention will be apparent to those skilled in the art. The invention has been described above by way of illustration, and the specific embodiments disclosed are not intended to limit the invention to the particular forms disclosed. For example, the particular implementation of the cover may vary depending upon the particular type of material used. The materials described in the foregoing were directed to pliable implementations; however, similar techniques are to provide covers that are made of more rigid materials such as, but not limited to, rigid plastics, various metals, composite materials, etc. Non-pliable implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus, consisting of:
a cover being configured to conform to a top and side surfaces of an electronics device operable for playing games, said cover comprising a top side, a first side and an opening disposed in a portion of said top side and a portion of said first side, said opening being configured for enabling access to a game slot of the electronic device, said cover further comprising a first part of a capturing mechanism disposed proximally about at least a portion of a perimeter of said opening, said capturing mechanism comprises a channel and a ridge, said cover is further configured to wrap over a perimeter of a bottom of the electronic device and said cover further comprises one or more apertures being configured to enable access to ports on the electronic device, each of said one or more apertures is further configured with dimensions matching a corresponding port, said one or more apertures further comprises a reinforcement about a perimeter of said one or more apertures that fits about a cable to form a seal, said cover further comprises at least one vent opening being configured to be disposed over a ventilation area of the electronic device, said cover further comprises texturing to provide a grip;
an opening cover being configured to at least cover said opening in which an edge of said opening cover is joined to said cover to form a flap, said opening cover comprising a second part of said capturing mechanism being configured to be removably joined to said first part of said capturing mechanism to form a seal where said cover and said opening cover are operable for mitigating entry of liquids and particles in covered areas of the electronics device and for mitigating impact and abrasion damage to covered areas of the electronic device, said cover and said opening cover further comprise a pliant material configured with a thickness to mitigate impact damage to the electronic device and exterior surfaces of said cover and said opening cover are further configured for personalization of appearance by a user; and
a mechanism for further securing said opening cover to said cover in a closed position said mechanism comprises a hook-and-loop material.

2. An apparatus, consisting of:
means being configured for covering surfaces of a video game console, said covering means being further configured for enabling access to a game slot of the video game console, for enabling access to ports on the video game console and for enabling ventilation of the video game console; and
means being configured for protecting the game slot, said protecting means being further configured to be removably joined to said covering means to form a seal where said covering means and said protecting means are operable for mitigating entry of liquids and particles in covered areas of the video game console and for mitigating impact and abrasion damage to covered areas of the video game console.

3. An apparatus, consisting of:
a cover being configured to snugly conform to a top and side surfaces of a video game console and to wrap over a perimeter of a bottom of the video game console, said cover comprising a pliant material configured with a thickness to mitigate impact damage to the video game console, said cover further comprising a top side, a first side and an opening disposed in a portion of said top side and a portion of said first side, said opening being configured for enabling access to a game slot of the video game console, said cover further comprising a first part of a capturing mechanism disposed proximally about at least a portion of a perimeter of said opening, said cover further comprises one or more apertures being configured to enable access to ports on the video game console in which each of said one or more apertures is further configured with dimensions matching a corresponding port and further comprises a reinforcement about a perimeter of said one or more apertures that fits about a cable to form a seal, said cover further comprising at least one vent opening being configured to be disposed over a ventilation area of the video game console, said cover further comprising texturing to provide a grip, said capturing mechanism comprises a channel and a ridge;
an opening cover being configured to at least cover said opening, said opening cover further comprising a pliant material configured with a thickness to mitigate impact damage to the video game console, said opening cover further comprising a second part of said capturing mechanism being configured to be removably joined to said first part of said capturing mechanism to form a seal where said cover and said opening cover are operable for mitigating entry of liquids and particles in covered areas of the video game console and for mitigating impact and abrasion damage to covered areas of the video game console, said cover and said opening cover further comprise a color scheme for matching to a surrounding décor in which exterior surfaces of said cover and said opening cover are further configured for personalization of appearance by a user; and a mechanism for further securing said opening cover to said cover in a closed position, said mechanism comprises a hook-and-loop material.

\* \* \* \* \*